Oct. 5, 1954

J. K. RUSSELL 2,690,802

METHOD OF AND APPARATUS FOR STAMPING
AND STACKING FILTER ELEMENTS

Filed Aug. 7, 1952

INVENTOR:
JOHN K. RUSSELL
BY HIS ATTORNEYS
HARRIS, KIECH, FOSTER & HARRIS
By Clarence F. Kiech

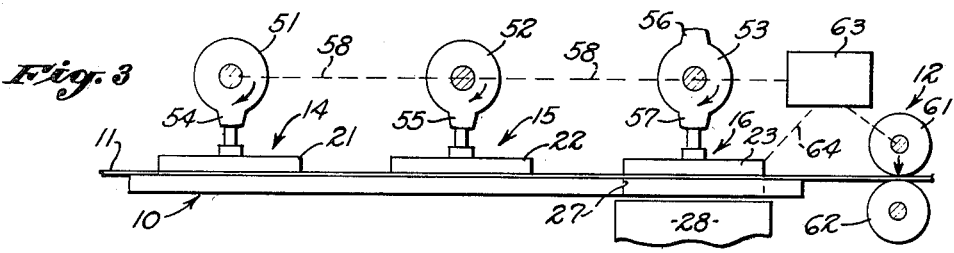
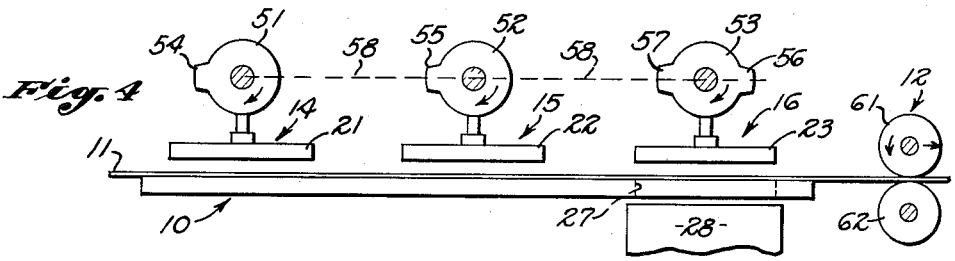
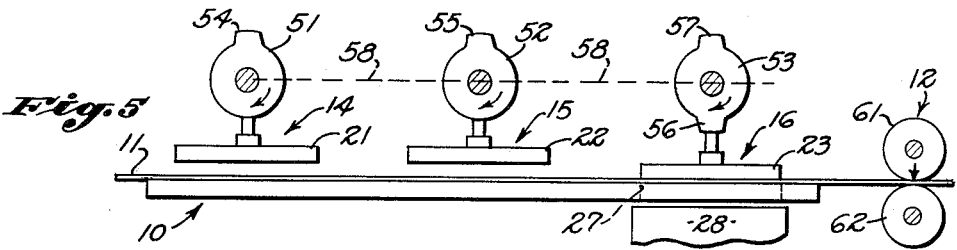
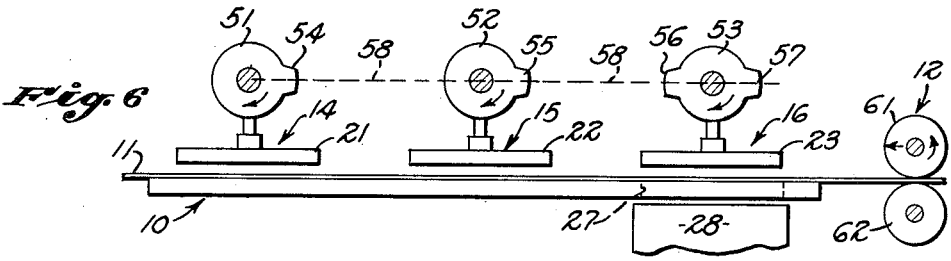
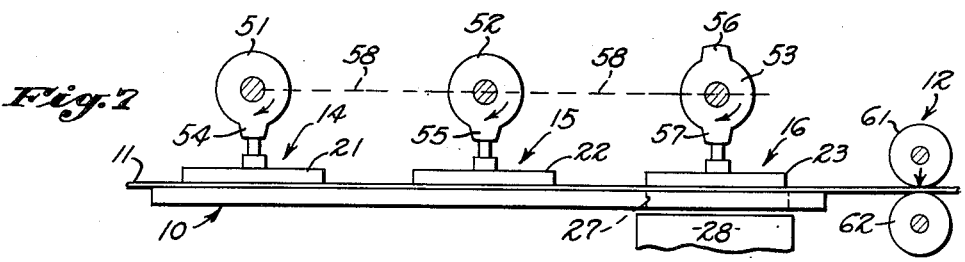

Patented Oct. 5, 1954

2,690,802

UNITED STATES PATENT OFFICE 2,690,802

METHOD OF AND APPARATUS FOR STAMPING AND STACKING FILTER ELEMENTS

John K. Russell, Los Angeles, Calif., assignor to Luber-Finer Incorporated, Los Angeles, Calif., a corporation of California Application August 7, 1952, Serial No. 303,020

6 Claims. (Cl. 164—12)

The present invention relates in general to a method of and apparatus for fabricating two or more different elements and stacking them in alternating relation, a primary object of the invention being to provide a method of and apparatus for fabricating the different elements and stacking them in alternating relation in one continuous operation.

The present invention finds particular utility in fabricating filter elements of different configurations from a strip of filter material and in stacking the different filter elements in alternating relation to form a filter unit or cartridge. As a matter of convenience, the invention will be considered in such connection herein with no intention of limiting the invention thereto since it may be employed for fabricating and stacking other elements as well.

In general, the present invention contemplates the employment of three dies each adapted to partially fabricate the different filter elements, the three dies being actuated in such a way that the third die completes the fabrication of the two different filter elements in alternating relation so that the two different filter elements are discharged by the third die in alternating relation so that they may be stacked in such relation.

More particularly, an object of the invention is to provide a method and apparatus for stamping from a continuous strip of filter material primary and secondary filter elements respectively provided with primary and secondary configurations which, when stamped out, partially fabricate the primary and secondary filter elements, and provided with identical tertiary configurations which, when stamped out, completely fabricate the primary and secondary elements and separate them from the strip, the apparatus being adapted to stamp out the tertiary configurations of the primary and secondary filter elements in alternating relation so that the elements are discharged in alternating relation as they are separated from the residue of the strip and may be stacked in such relation.

Another object is to provide an apparatus which includes first, second and third dies respectively having the primary, secondary and tertiary configurations thereon and adapted to stamp them in the strip of filter material.

Another object is to provide an actuating means for the three dies which actuates the first and second dies at a predetermined frequency and which actuates the third die at a frequency double this predetermined frequency. A further object is to provide an intermittently-operating advancing means for advancing the strip of filter material incrementally by increments equal to the spacing between the dies.

With the foregoing construction, the first die partially fabricates the primary filter element and the second die partially fabricates the secondary filter element, this being done at the aforementioned predetermined frequency. Subsequently, the partially fabricated primary and secondary filter elements are moved sequentially into registry with the third die and this die, which is operated at a frequency double the predetermined frequency, stamps out the tertiary configuration which is common to the primary and secondary filter elements, the partially fabricated primary and secondary filter elements arriving at the third die in alternating relation so that they are completely stamped out by the third die in alternating relation and may be stacked in such relation, which is an important feature of the invention.

Another object of the invention is to provide an actuating means for the three dies which actuates the first and second dies in unison, and which actuates the third die twice as frequently as the first and second dies, the third die being actuated in unison with the first and second dies during every other actuation of the third die. With this construction, the first, second and third dies periodically move into stamping engagement with the strip of filter material in unison and, between such actuations of the first, second and third dies, the third die is moved into stamping engagement with the strip of filter material while the first and second dies remain out of engagement therewith.

Thus, it will be seen that the present invention provides a method of and apparatus for forming two different elements from a single strip with three dies in one continuous operation, the first and second dies being actuated in unison with the third during alternate actuations of the latter. This represents an important advantage over forming the primary and secondary configurations of the primary and secondary filter elements independently of each other and/or the formation of the tertiary configuration thereof since it avoids any necessity of having to re-index the partially fabricated primary and secondary filter elements relative to the third die, the partially fabricated primary and secondary filter elements being indexed relative to the third die automatically as a strip of filter material moves through the apparatus, which is an important feature of the invention.

The foregoing objects and advantages of the present invention, together with various other objects and advantages thereof which will become apparent, may be attained with the exemplary embodiment of the invention which is illustrated in the accompanying drawings and which is described in detail hereinafter. Referring to the drawings:

Figs. 3 to 7 are diagrammatic elevational views illustrating the operation of the apparatus of the invention.

Figure 1:
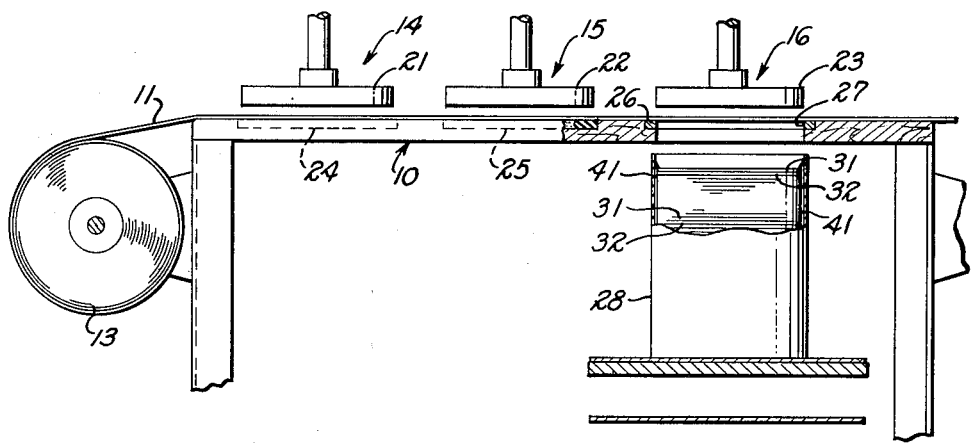
Fig. 1 is an elevational view of a diagrammatically illustrated apparatus which embodies the present invention and which is capable of performing the method thereof.

Referring to the drawings, and particularly to Fig. 1 thereof, the numeral 10 designates a supporting means, illustrated as table-like in nature, over which a strip 11 of filter material is adapted to be advanced incrementally by an advancing means 12, Fig. 3, the strip 11 being unwound from a roll 13 mounted on the supporting means 10. Adapted to operate on the strip 11 of filter material are three die means 14, 15 and 16 respectively including movable dies 21, 22 and 23 and stationary dies 24, 25 and 26. The stationary dies 24, 25 and 26 are carried by the supporting means 10 and are covered by the strip 11 as it moves thereacross, the movable dies 21, 22 and 23 being disposed above the strip. The third stationary die, i. e., the stationary die 26, is provided with an aperture 27 therethrough through which the filter elements are discharged into a receptacle 28, the latter being, for example, a can of the general character employed to house replaceable filter units or cartridges.

Figure 2:
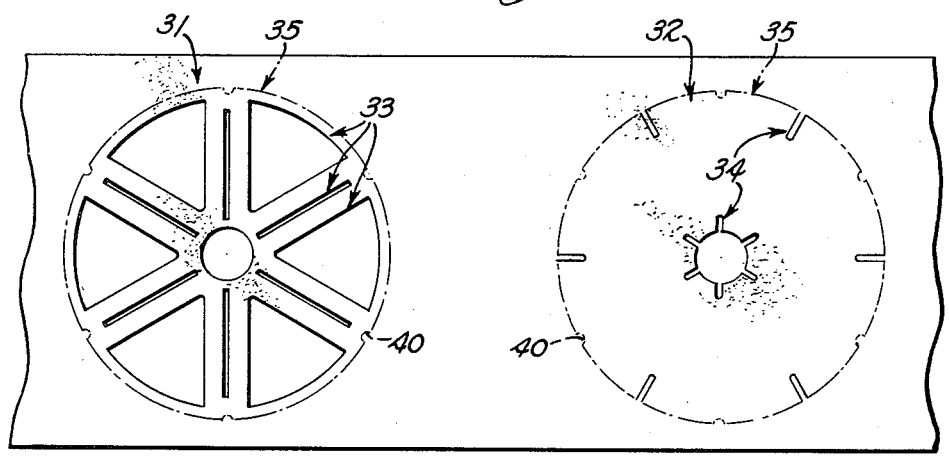
Fig. 2 is a plan view of a strip of filter material showing partially fabricated primary and secondary filter elements.

Referring particularly to Fig. 2 of the drawings, illustrated therein as formed in the strip 11 are primary and secondary filter elements 31 and 32, the primary filter elements 31 having what is termed herein a primary configuration 33, which is shown in solid lines, and the secondary filter element 32 having what is termed herein a secondary configuration 34, which is shown in solid lines. The primary and secondary filter elements 31 and 32 also have identical tertiary configurations 35, which are shown in dot and dash lines. The primary, secondary and tertiary configurations 33, 34 and 35 shown are illustrative only and others may be substituted therefor without departing from the spirit of the invention.

In forming a filter unit or cartridge, it is necessary to stack the primary and secondary filter elements 31 and 32 in the receptacle 28 in alternating relation and the manner in which this is accomplished will now be discussed in detail.

The configuration of the die means 14 corresponds to the primary configuration 33 and, when the movable die 21 is brought into stamping engagement with the strip 11, the die means 14 is adapted to stamp the primary configuration 33 therein. Similarly, the die means 15 and 16 are provided with the secondary and tertiary configurations 34 and 35 therein and, when the dies 22 and 23 are moved into stamping engagement with the strip 11, the die means 15 and 16 stamp the secondary and tertiary configurations 34 and 35 therein. As will be apparent, the stamping of the primary and secondary configurations 33 and 34 in the strip 11 results in partial fabrication of the primary and secondary filter elements 31 and 32 without complete detachment of these elements from the strip 11. When the partially fabricated primary and secondary filter elements 31 and 32 are successively brought into registry with the third die means 16 and the tertiary configuration 35 is stamped into the strip 11 in superimposed relation with the previously stamped primary and secondary configurations 33 and 34, fabrication of the primary and secondary filter elements 31 and 32 is completed and these elements are detached or separated from the strip, being discharged through the central aperture 27 in the stationary die 26 into the receptacle 28, the primary and secondary filter elements 31 and 32 being discharged into the receptacle 28 in alternating relation so that they are stacked in alternating relation in the receptacle. Notches 40 formed in the peripheries of the primary and secondary filter elements 31 and 32 by the third die means 16 receive ribs 41 within the receptacle 28 to prevent rotation of the primary and secondary filter elements 31 and 32. The notches 40 form parts of the tertiary configuration 35 common to the primary and secondary filter elements 31 and 32.

Referring to Figs. 3 to 7 of the drawings, the movable dies 21, 22 and 23 are moved into stamping engagement with the strip 11 by cams 51, 52 and 53, respectively. The cams 51 and 52 are provided with single lobes 54 and 55, respectively, and the cam 53 is provided with two lobes 56 and 57. The cams 51, 52 and 53 are interconnected so that they rotate in unison at identical rotational speeds, the interconnection between them being indicated by the broken line 58. The advancing means 12 is shown as including two rollers 61 and 62 between which the strip 11 of filter material is clamped, the roller 61 being shown diagrammatically as connected to the cams 51 to 53 through a control device 63 which is actuated whenever all of the movable dies 21, 22 and 23 are out of engagement with the strip 11. The control device 63 may, for example, comprise a single revolution clutch which is actuated whenever the movable die 23 is moved out of engagement with the strip 11, a connection between the die 23 and the control device 63 being indicated by the broken line 64. When actuated by retraction of the movable die 23, the control device 63 may rotate the roller 61 through one revolution, which advances the strip 11 a distance equal to the spacing between the die means 14, 15 and 16 if the circumference of the roller 61 is equal to such spacing. Preferably, the control device 63 includes means, not shown, for rotating the roller 61 at a higher speed than that of the cams 51 to 53 to insure advancing the strip 11 the desired increment in a time less than that required for one of the lobes 56 and 57 of the cam 53 to disengage the movable die 23 and the other lobe to engage it, thereby insuring the desired incremental advance of the strip 11 between actuations of the movable die 23.

Considering the operation of the apparatus of the invention, beginning with Fig. 3 of the drawings, all of the movable dies 21 to 23 are shown in stamping engagement with the strip 11, the dies 21, 22 and 23 having moved into stamping engagement with the strip 11 by the lobes 54, 55 and 57 of the cams 51, 52 and 53, respectively. Thus, the die means 14, 15 and 16 respectively form the primary, secondary and tertiary configurations 33, 34 and 35 in the strip 11. With the various components in the positions shown in Fig. 3, the third die means 16 is superimposing the tertiary configuration 35 on a previously formed primary configuration 33 to produce a primary filter element 31, which is then discharged through the central aperture 27 in the stationary die 26 and into the receptacle 28. As previously discussed, the peripheral notches 40 receive the ribs 41 on the interior of the receptacle 28 to properly align this filter element within the receptacle.

Turning now to Fig. 4 of the drawings, the movable dies 21, 22 and 23 have been retracted by the respective cams 51, 52 and 53, retraction of the movable die 23 having caused actuation of the advancing means 12. In Fig. 4 of the drawings, the advancing means 12 is in the process of advancing the strip 11 of filter material an increment equal to the spacing of the die means 14, 15 and 16, whereby to position the secondary configuration 34 formed in Fig. 3 of the drawings in registry with the die means 16.

Referring to Fig. 5 of the drawings, the second lobe 56 on the cam 53 has moved the third movable die 23 into stamping engagement with the strip 11 to superimpose the tertiary configuration 35 on the previously formed secondary configuration 34, the movable dies 21 and 22 remaining retracted. This results in completing the fabrication of a secondary filter element 32, which is discharged through the central aperture 27 in the stationary die 26 and into the receptacle 28 on top of the previously formed primary filter element.

Turning now to Fig. 6 of the drawings, the movable die 23 has again been retracted, the movable dies 21 and 22 remaining retracted. The retraction of the movable die 23 has resulted in actuation of the advancing means 12 which is in the process of advancing the strip 11 of filter material another increment to bring a previously formed primary configuration 33 into registry with the third die means 16. Referring now to Fig. 7 of the drawings, the cams 51 to 53 have moved all of the movable dies 21 to 23 into stamping engagement with the strip 11, whereupon the die means 16 forms the tertiary configuration 35 in the strip 11 again, which tertiary configuration is superimposed on the primary configuration 33 previously formed to complete the fabrication of a primary filter element 31 and to discharge it through the aperture 27 into the receptacle 28 on top of the secondary filter element previously placed in the receptacle 28. At the same time, the die means 14 and 15 are forming new primary and secondary configurations 33 and 34 in the strip 11.

The foregoing sequence of events is repeated until the requisite primary and secondary filter elements 31 and 32 have been stacked in the receptacle 28 in alternating relation.

Thus, the present invention provides an apparatus which continuously forms filter elements of different configurations in the same strip of material and which stacks the elements of different configurations in alternating relation automatically as the fabrication thereof is completed, which is an important feature of the invention.

Another important feature of the invention resides in operating all of the movable dies 21 to 23 in unison during alternate actuations of the movable die 23, the movable dies 21 and 22 remaining stationary during the intervening actuations of the die 23. By operating the dies with this relationship between them, it is not necessary to use any special indexing means for properly indexing the partially fabricated primary and secondary filter elements 31 and 32 relative to the third die means 16 since the necessary indexing takes place automatically with the structure illustrated. In other words, if the primary and secondary configurations 33 and 34 were formed in the strip 11 independently of the tertiary configuration 35 it would be necessary to provide additional means for indexing the primary and secondary configurations relative to the die means 16, no such additional indexing means being required by the structure of the present invention, which is an important feature.

Although I have disclosed an exemplary embodiment of the method and apparatus of my invention and an exemplary application thereof to the fabrication and stacking of filter elements, it will be understood that other applications of the invention are possible and that various changes, modifications and substitutions may be incorporated in the embodiment disclosed, all without departing from the spirit of the invention.

I claim as my invention:

1. An apparatus for stamping from a continuous strip primary and secondary elements respectively provided with primary and secondary configurations which, when stamped out, partially fabricate said primary and secondary elements, and each provided with a tertiary configuration which, when stamped out, completely fabricates said primary and secondary elements and separates them from said strip, said apparatus stacking said primary and secondary elements in alternating relation as said tertiary configurations thereof are stamped out, including: die means including spaced, first, second and third dies respectively having said primary, secondary and tertiary configurations and adapted to stamp same in said strip; supporting means adjacent said dies for supporting said strip in a position to be engaged by said dies; actuating means connected to all of said dies for moving same into stamping engagement with said strip, said actuating means including means for moving said first and second dies into stamping engagement with said strip in unison at a predetermined frequency and including means for moving said third die into stamping engagement with said strip at a frequency double that of said predetermined frequency; advancing means engageable with said strip for moving said strip a distance equal to the spacing between said dies; operating means for operating said advancing means after each actuation of said third die; and means for receiving said primary and secondary elements from said third die, the latter delivering said primary and secondary elements to said receiving means in alternating relation.

2. An apparatus according to claim 1 wherein said actuating means for said dies includes means for producing alternate movements of said third die into stamping engagement with said strip in unison with the movements of said first and second dies into stamping engagement with said strip.

3. In an apparatus of the character described, the combination of: first, second and third dies uniformly spaced apart; advancing means engageable with a strip to be acted upon by said dies for moving the strip past said dies by increments equal to the spacing of said dies; actuating means connected to all of said dies for moving said first and second dies into stamping engagement with said strip in unison at a predetermined frequency and for moving said third die into stamping engagement with said strip at a frequency double said predetermined frequency;

and means for actuating said advancing means after each actuation of said third die.

4. An apparatus as defined in claim 3 wherein said actuating means includes means for moving said first, second and third dies into stamping engagement with said strip in unison during alternate actuations of said third die.

5. A method of stamping from a continuous strip movable along a predetermined path primary and secondary elements respectively provided with primary and secondary configurations which, when stamped out, partially fabricate said primary and secondary elements, and each provided with a tertiary configuration which, when stamped out, completely fabricates said primary and secondary elements and separates them from said strip, said method stacking said primary and secondary elements in alternating relation as said tertiary configurations thereof are stamped out, including the steps of: stamping out said primary and secondary configurations in unison at spaced primary and secondary stations on said path and at a predetermined frequency; stamping out said tertiary configurations at a tertiary station on said path and at a frequency double said predetermined frequency, said tertiary station being spaced from said secondary station a distance equal to the distance said secondary station is spaced from said primary station; and advancing said strip by increments equal to said distance at a frequency double said predetermined frequency, said strip being advanced after each tertiary configuration has been stamped out.

6. The method defined in claim 5 including the step of stamping out alternate ones of said tertiary configurations in unison with the stamping out of said primary and secondary configurations.

References Cited in the file of this patent

UNITED STATES PATENTS

| Number | Name | Date |
|---|---|---|
| 1,694,939 | Heftler | Dec. 11, 1928 |
| 1,729,123 | Philip | Sept. 14, 1929 |